United States Patent [19]

Pierson et al.

[11] Patent Number: 5,315,227
[45] Date of Patent: May 24, 1994

[54] SOLAR RECHARGE STATION FOR ELECTRIC VEHICLES

[76] Inventors: Mark V. Pierson, 65 Hospital Hill Rd., Binghamton, N.Y. 13901; How T. Lin, 1200 Hartwick La., Binghamton, N.Y. 13903

[21] Appl. No.: 10,888
[22] Filed: Jan. 29, 1993
[51] Int. Cl.$^5$ ............................................. H02J 7/00
[52] U.S. Cl. ......................................... 320/2; 320/61
[58] Field of Search .................................... 320/2, 61

[56] References Cited
U.S. PATENT DOCUMENTS

| | | | |
|---|---|---|---|
| 3,273,038 | 9/1966 | Miller | 320/2 |
| 3,596,018 | 7/1971 | Elmes | 320/2 X |
| 3,603,860 | 9/1971 | Johnson | 320/2 |
| 3,971,454 | 7/1976 | Waterbury | 320/56 X |
| 4,080,221 | 3/1978 | Manelas | 320/2 X |
| 4,277,737 | 7/1981 | Müler-Werth | 320/2 |
| 4,309,644 | 1/1982 | Reimers et al. | 320/2 X |
| 4,315,163 | 2/1982 | Bienville | 307/66 |
| 4,347,472 | 8/1982 | Lemelson | 320/2 |
| 5,187,423 | 2/1993 | Marton | 320/2 |

Primary Examiner—R. J. Hickey
Attorney, Agent, or Firm—Douglas M. Clarkson

[57] ABSTRACT

A solar recharge station is described having a contact area, a battery bank charge area and a solar panel array for maintaining the battery bank charged. The contact area includes electric contacts formed for engagement automatically by contacts on an electric powered vehicle as the vehicle enters the contact area. The battery bank is connected so that its energy is available for either recharging the vehicle or other use, and in case the vehicle needs a recharge but the battery banks lacks sufficient charge, ordinary house voltage is used.

10 Claims, 3 Drawing Sheets

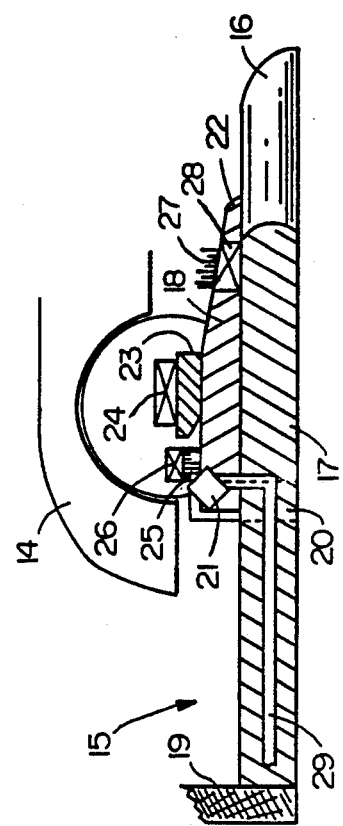
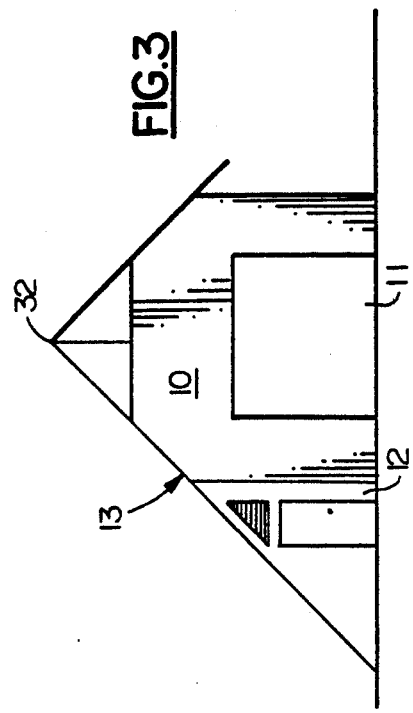
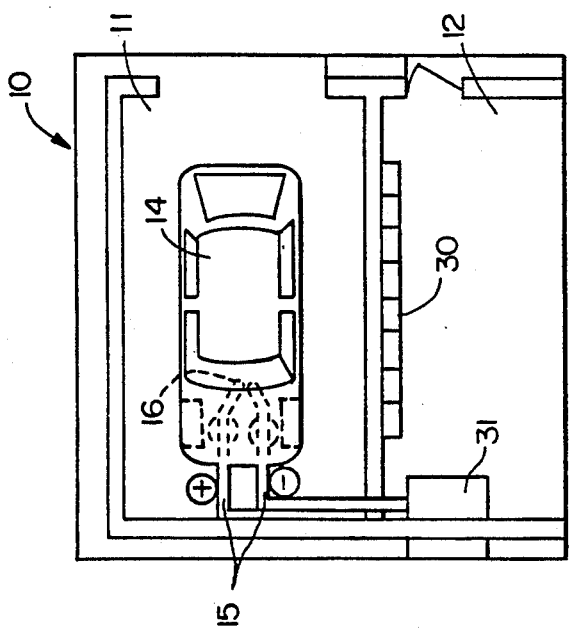
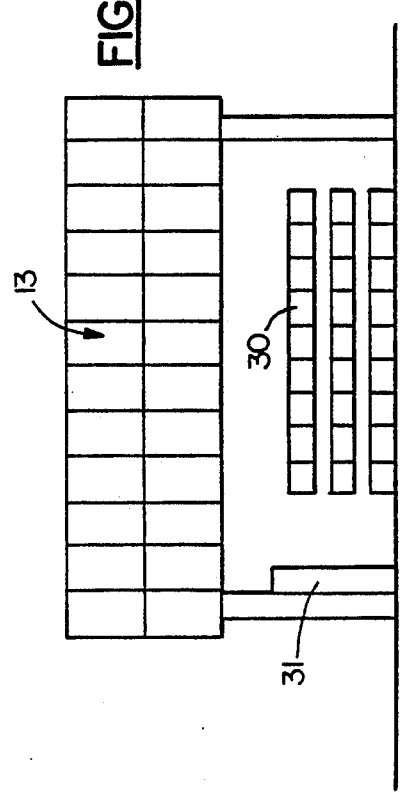

SOLAR RECHARGE STATION FOR ELECTRIC VEHICLES

BACKGROUND OF THE INVENTION

1. Field of the Invention

The present invention, generally, relates to electric vehicles and, more particularly, to a new and improved station for restoring the electric power for such vehicles.

Solar energy has become increasingly popular as a source of electric power. One reason for this is the increased attention and concern that has been given recently to the highly polluting characteristics of the internal combustion engine, particularly as it affects the environment, and much experimentation has lead to the development of an effective electric powered automobile.

Electric powered vehicles are non-polluting, but the energy that they require, generally, comes from an environment polluting source. For example, if the electric energy source is a local electric utility grid, 80% of these use polluting fuels in order to generate their electrical energy.

Furthermore, only a small percentage of all generated electrical energy is actually available for use by the consumer, all the rest is lost in generation, transmission and distribution. Therefore, if any environmental gains are to be realized in converting to an electric vehicle, a low cost, convenient, easily accessible, readily available pollution free source for electricity is a convenience; it is a necessity and a requirement.

2. Description of the Prior Art

An early U.S. Pat. No. 4,090,577 that issued on May 23, 1978, to Moore describes the use of solar energy but not separate from an automobile.

U.S. Pat. No. 4,182,960 was granted Jan. 8, 1980, to Reuyl and describes the use of solar energy for charging batteries to heat a house and to propel a vehicle.

U.S. Pat. No. 4,850,879 to Langenbahn, granted Jul. 25, 1989, describes a drive-up electrical connection for attaching house current to a vehicle providing heat.

U.S. Pat. No. 4,885,995 issued on Dec. 12, 1989, to Antosh describes a monorail system operating from solar energy with means to charge ground support vehicles.

While the structural arrangements of these prior art devices at first appearance have similarities with the arrangement of the present invention, they differ in material respects. These differences will become more apparent as the present description proceeds.

OBJECTS AND SUMMARY OF THE INVENTION

An important object of the present invention is to provide a charging station, for an electrically powered vehicle, that is energy efficient.

It is also an important object of the invention to provide a charging station, for an electrically powered vehicle, that is environmentally safe.

Another object of the present invention is to provide a charging station, for an electrically powered vehicle, that is convenient to use.

Still another object of the invention is to provide a charging station, for an electrically powered vehicle, that is connected to the vehicle automatically.

Yet another object of the present invention is to provide a new and improved arrangement, for an electrically powered vehicle, to collect electrical energy during daylight hours.

Briefly, a charging station that is constructed and arranged in accordance with the principles of the invention has an energy storage area, a vehicle storage area and a solar panel array exposed to a source of radiation for converting the radiation into electrical energy. The electrical energy is stored in the energy storage area until the vehicle is returned to its storage area, where the electrical energy is connected for recharging the vehicle.

The above, other and further objects, advantages and features of the present invention will become more readily apparent from the following detailed description of the presently preferred form of the invention as illustrated in the accompanying drawings.

BRIEF DESCRIPTION OF THE DRAWINGS

FIG. 1 is a plan view of a vehicle recharging station that is arranged according to the invention.

FIG. 2 is a view in elevation of the energy storage area as arranged in accordance with the present invention.

FIG. 3 is a view in elevation showing the front of the vehicle recharging station of the invention.

FIG. 4 is a view in elevation showing, in cross section, a preferred arrangement of an electrical contact between the vehicle and the energy storage area.

DETAILED DESCRIPTION OF THE INVENTION

Figure 6:
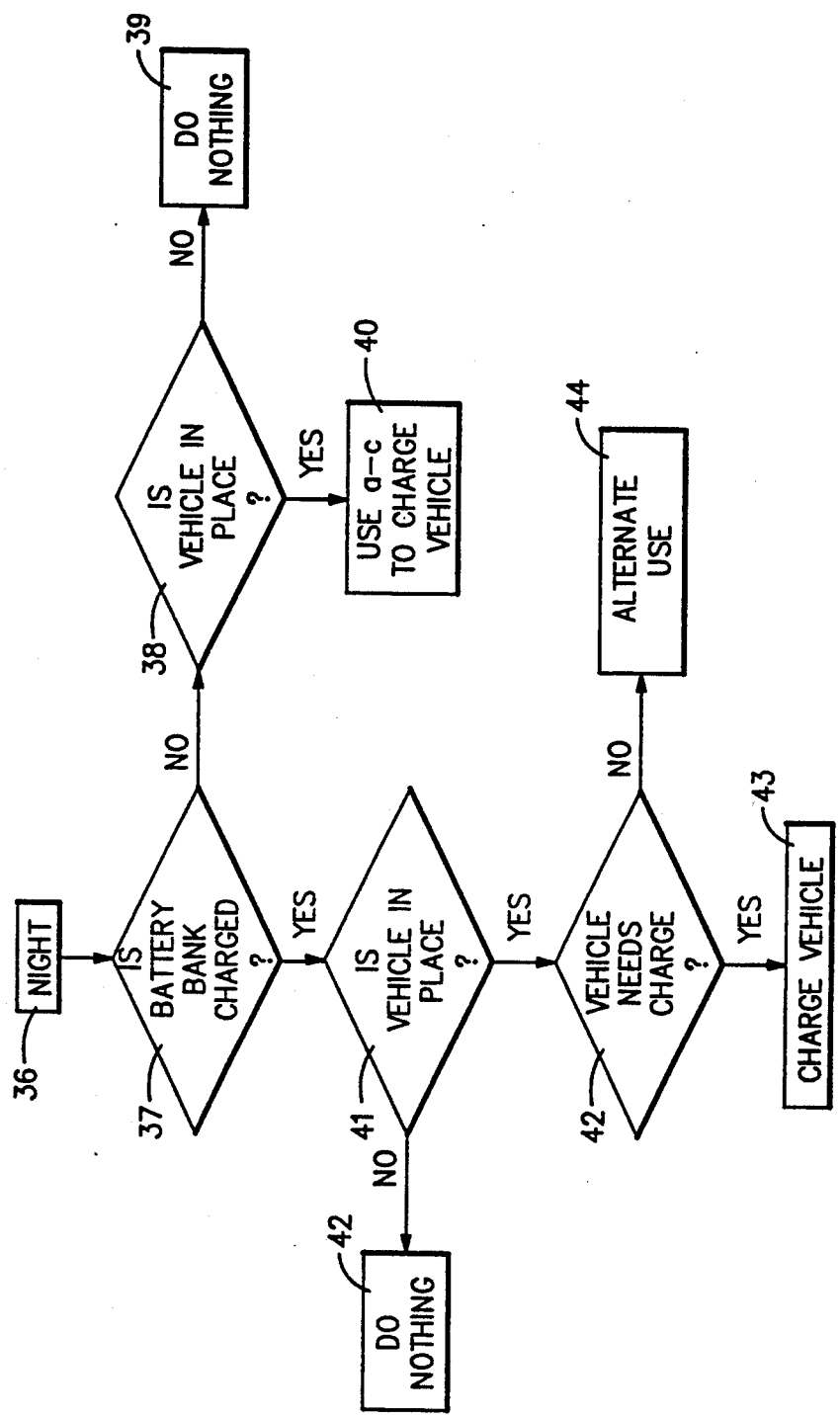
FIG. 6 is a flow chart illustrating various information, action and decision steps for charging a vehicle stored in the vehicle recharging station of the invention.

Referring first to FIG. I of the drawings, the reference numeral 10 identifies the vehicle recharging station generally, which includes three components, (1) a contact room 11, (2) a charge room 12 and a radiation panel array 13.

The Contact Room 11. This is an area for storing any number of vehicles. By "storing" is meant to leave a vehicle 14 safely, unattended, usually overnight. A customary manner of use to which the contact room 11 is put today is a "garage" for enclosing at least one automobile.

Located within the contact room 11 is at least one, but preferably two, rails 15 to align a vehicle relative to the electrical contacts of the present invention for connecting an electrical storage element in the vehicle automatically to the recharging station 10 as the vehicle is moved into the contact room 11. By the term "electrical storage element" is meant, in today's terminology, a battery, even though a "battery" stores chemical energy, but it stores the chemical energy in a way so that it is converted readily into electrical energy when proper connections are made.

As shown in this view, the ends 16 of the vehicle guide rails 15 are curved toward each other. This is an important aspect of their arrangement for, first, capturing the front wheels of a vehicle 14 as it moves into the contact room 11 and, then, to guide the vehicle relative to engaging electrical contacts for the recharging function.

Refer to FIG. 4 to complete the description of the structural arrangement of the guide rails 15. The rails 15 have two parts, a guide rail 17 on the bottom, that is affixed firmly to the floor, and an electrical contact 18 on the top.

The guide rail 17 is formed of a suitable dielectric material, preferably wood, and the electrical contact 18 on top is formed of a suitable electrically conductive material which, also, will not rust readily, preferably copper. Each rail 17 is of a sufficient length to extend between one third and one half the length of the contact room 11 from the end wall 19 of the room.

In contrast, the length of the contact 18 is shorter. It extends only far enough so that electrical contact will be ensured when the vehicle is located properly. With the guide rails 15 positioning the vehicle correctly in a side to side direction, a front stop 20 positions the vehicle correctly in a forward direction. The stop 20 can take several different forms, in accordance with the invention.

A presently preferred form of front stop 20 is a rail that is located laterally across the path of the front wheels of the vehicle to be engaged by the wheels for stopping forward movement when positioned correctly. When a vehicle is located in this position, with its front wheels against the front stop 20, the length of the contact 18 is illustrated as being sufficient to extend about one half the distance to the front of the vehicle 14 and extending rearwardly about the same distance. The exactness of this dimension clearly is not critical to the proper functioning of the invention.

The front stop 20 includes at least one switch 21, but preferably two, which is closed by the vehicle 14 when positioned correctly against the front stop 20. The switch 21 forms an electrical indication that the vehicle 14 is in the correct position for its recharging operation.

The end 22 of the contact 18 sloops downwardly to ensure that a contact 23 on the vehicle 14 engages the upper surface of the fixed contact 18 smoothly and slides along that surface against the action of a spring 24 that urges the contact 23 firmly in a downward direction. The leading end of the contact 23 is beveled for further assurance that the contact 23 engages the fixed contact 18 in a smooth sliding action.

By this means, a good electrical contact is formed between the vehicle 14 and the fixed contact 18 on the floor of the contact room 11. The upper surface of the fixed contact 18 is wiped by a wire brush 25 on the vehicle, and to further ensure a good wiping action, the wire brush 25 is urged downwardly by a spring 26. Similarly, a wire brush 27 is located at the forward end 22 of the fixed contact 18 and is urged upwardly by a spring 28 to be engaged by the contact 23 on the vehicle 14 as the vehicle 14 moves into a recharging position.

An electrical connection 29 is attached to each contact 18 by any suitable means, and since usually the voltage is low, it need not be hidden or protected in any manner. But the current is high usually, or it can be relatively high, and therefore, this connection should be sized appropriately for the expected current flow. This, of course, is a matter of selection that is well within the purview of a skilled technician.

The Charge Room 12. The view in FIG. 2 shows the room, or area, in which is located a plurality of batteries, identified generally by the reference numeral 30. The presently preferred arrangement is that this area should be enclosed as a separate room 12 for safety reasons.

It is contemplated, according to the invention, that the batteries 30 are inexpensive, heavy duty, deep cycle batteries that will not out-gas or pollute in any way. They will be required to take a charge and be discharged repeatedly, which most batteries will do readily today. The batteries 30 are supported in any convenient manner, such as on several shelves or racks, as long as each is accessible for independent servicing, as needed.

Also located within the charge room 12 is a controller 31 enclosing a preselected number of switches, relays and other connections that a particular installation may require. As an example of one arrangement, the controller 31 will enclose a relay with windings for sensing low battery voltage and for opening contacts to disconnect the batteries 30 and to connect a charge cycle through a rectifier for supplying electrical current from ordinary house voltage during an otherwise normal recharge routine.

Other features that a particular installation may require are designed into the controller 31, all of which are readily within the skills of a technician. Another example is a relay connected to be energized by the closing of the switch 21 when the vehicle 14 is in position to begin a recharge routine which will connect the batteries 30 through the connection 29 to recharge the batteries in the vehicle 14 automatically.

The Radiation Panel Array 13. FIG. 3 illustrates a front view of an overall housing, not only to enclose the contact room 11 and the charge room 12, but to support the panel array 13 of radiation converters, such as solar cells. While solar cells are within the purview of present day technology, the invention is not limited to solar cells. For example, the rapid advance of this technology today may produce a way of converting other sources of radiation directly into electrical energy.

The panel array 13 is supported according to already known arrangements on the roof 32 of the vehicle recharging station 10. It is contemplated also that the direction of the panel array 13 will be toward the source of radiation, or if solar cells are used, toward the south.

Approximately 5000 individual solar cells, each capable of developing approximately 0.9 watts of power in direct sunlight, are mounted, protected and connected electrically in the panel array 13. These connections are in an appropriate series and parallel arrangement to provide the correct maximum voltage for charging the batteries 30.

Figure 5:
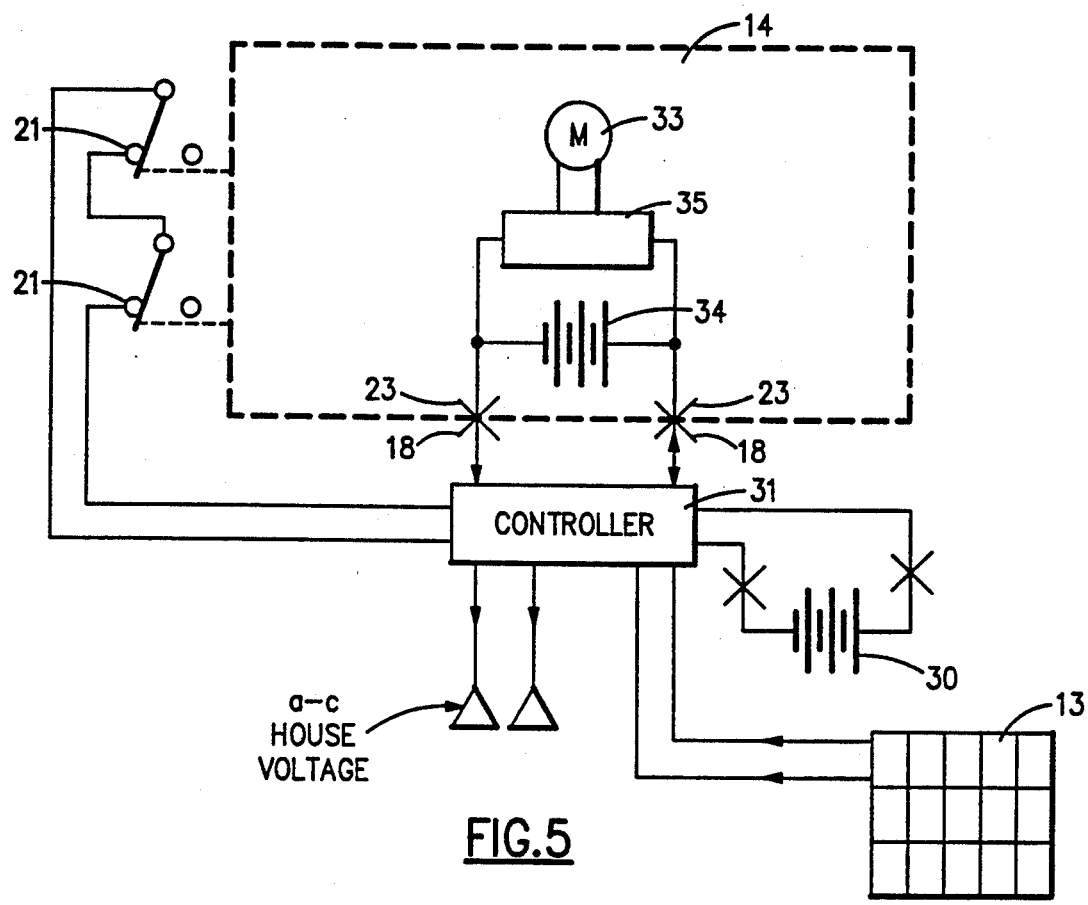
FIG. 5 is an electrical circuit showing contacts, wiring, and switches arranged for effective operation of the recharging station of the invention.

The circuit diagram in FIG. 5 illustrates the respective features described above and shows in more detail how they interrelate with each other. The same reference numerals are used to indicate the same or comparable component parts that are described in detail above.

The vehicle 14 is illustrated as having a motor 33, or other prime mover, that is energized from a direct current source, such as a battery 34. The block 35 includes various controls that a vehicle manufacturer may design and build into its own version of the electric powered vehicle 14, such as an accelerator, head light switch, etc.

The sliding electrical contacts 23 are shown engaging the fixed contacts 18, and the switches 21, that indicate when the vehicle is in the correct position for recharging, are shown connected to the controller 31. A connection with house voltage also is illustrated, and its need will be described in more detail hereinafter.

Flow Charts

Referring now to FIG. 6, the operation of the present invention will be described in connection with a flow chart of an interval of time when the vehicle 14 is stored in its garage, or the contact room 11. As indicated by the block 36, this time usually is at night.

Upon a determination whether the battery bank 30 is charged, as indicated by the block 37, assume that the answer is, "No". The next determination to be made is, "Is the vehicle in place", indicated by the block 38 on receiving information from the switches 21.

Assume that the answer is, "No", the vehicle is not in a correct position for having its battery recharged. There is nothing further to be done, and this is indicated by the block 39. Whereupon the controller 31 does not connect the battery bank 30 to the vehicle battery.

If the battery bank 30 is not charged but the vehicle 14 is in a correct position for being recharged, ordinary alternating current is used, as indicated by the block 40. This is made from house voltage that is rectified within the controller 31. It is not expected that the use of house voltage will be required in many instances, but it is available for which the invention makes provision.

Returning to the first decision made as indicated by the block 37, assume that the answer to the question, "Is the battery bank 30 charged?", is, "Yes". Again the question is asked, "Is the vehicle in place?" for being recharged, indicated by the block 41, and again, if the answer is, "No", there is nothing further to be done, which is indicated by the block 42.

However, if the answer to the question, "Is the vehicle in place?" for being recharged, block 41, is, "Yes", a question for which a determination must be made is, "Does the vehicle need recharging?". The block 42 indicates this decision, and if the answer is determined to be, "Yes", recharging is begun from the battery bank 30, indicated by the block 43.

On the other hand, if the answer to the question, "Is the vehicle in place?", is, "No", the fully charged battery bank 30 is available for alternative uses, indicated by the block 44.

Figure 7:
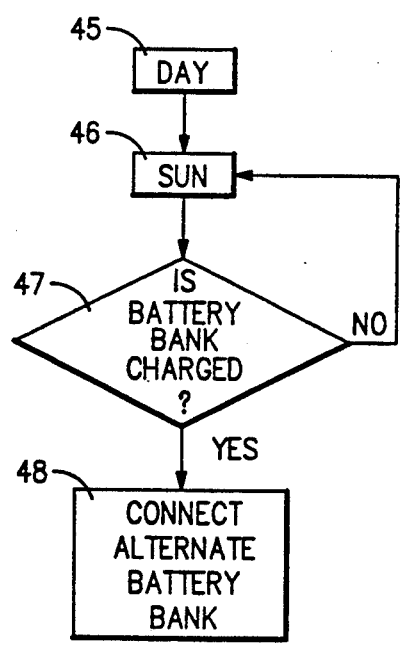
FIG. 7 is a flow chart illustrating various information, action and decision steps for storing electrical energy from a source of radiation.

In FIG. 7 of the drawings, the block 45 indicates an interval of time when the vehicle 14 is removed from its garage or the contact room 11, usually during the day. The block 46 indicates that it is during this interval that sunlight is most likely to be available.

The decision now must be made to the question, "Is the battery bank charged?", indicated by the block 47. If the answer is, "No", which is most likely because the vehicle is recharged overnight, a connection is made by the controller 31 to connect the battery bank 30 to the solar panel array 13, from which the battery bank 30 will be recharged.

On the other hand, if the answer is, "Yes", to the question in the block 47, indicating that the battery bank 30 is, in fact, fully charged, this charge is available for such uses as heating water, pumping water for the lawn, etc. This is indicated by the block 48.

The invention has been shown and described in detail referring to preferred embodiments. It is understood that changes may be made, but all changes coming within the claims are within the scope of the invention.

What is claimed is:

1. A solar recharge station for electric powered vehicles having electric contact means, comprising:

housing means including at least an inside, an outside, at least two areas including a contact room and a separate charge room, and roof means;

said contact room having space for enclosing at least one electric powered vehicle having vehicle electric contact means;

electric contact means affixed within said contact room including foxed position guide means for guiding said electric powered vehicle for said vehicle electric contact means to engage said fixed position guide means automatically;

means for wiping said vehicle electric contact means and said electric contact means within said contact room as said solar powered vehicle is guided by said fixed position guide means;

said separate charge room having space to retain battery means including connections with said electric contact means affixed within said contact room; and solar panel array means supported by said roof means including connections for charging said battery means.

2. A solar recharge station as defined by claim 1 wherein said electric contact means on said electric powered vehicle are formed to engage said fixed position contact means in a sliding action.

3. A solar recharge station as defined by claim 2 including rail means affixed within said contact room for guiding said electric powered vehicle so that said electric contact means meet in said sliding action.

4. A solar recharge station as defined by claim 3 wherein said rail means include two raised, elongated guides for engaging said vehicle in a guiding action, said two raised elongated guides terminating in ends, one end of each guide being positioned adjacent a back wall of said contact room and the other end of each guide being curved toward each other.

5. A solar recharge station as defined by claim 4 wherein each of said two raised, elongated guides supports said fixed position electric contact means.

6. A solar recharge station including a plurality of solar cells for generating electric energy for recharging an electric powered vehicle having battery means that require recharge periodically, comprising:

said electric powered vehicle having two contact means in spaced apart location, each of said two contact means being connected to a different terminal on said battery means;

said solar recharge station having a contact room, a charge room and roof means to support said plurality of solar cells;

said contact room including two fixed location contact means, and guide means for guiding a vehicle so that the two contact means on said vehicle engage said two fixed location contact means in said contact room;

means to wipe said two contact means on said vehicle and said fixed location contact means as said vehicle is guided by said guide means; and battery bank means in said charge room connected electrically to said plurality of solar cells for recharging by said solar cells.

7. A solar recharge station as defined by claim 6 wherein each of said two contact means on said electric powered vehicle being formed to engage each respective fixed location contact means in said contact room in a sliding action.

8. A solar recharge station as defined by claim 6 wherein said means to wipe includes abrasive means located in a position to be engaged by said two contact means on said electric powered vehicle before engaging said two fixed location contact means in said contact room.

9. A solar recharge station as defined by claim 8 wherein said means to wipe includes abrasive means located on said electric powered vehicle for engaging each of said two fixed location contact means in said contact room.

10. A solar recharge station as defined by claim 9 including spring means to urge each of said abrasive means for engaging respective contact means, and spring means for urging said contact means into engagement.

* * * * *